US009436796B2

(12) United States Patent
Dixon

(10) Patent No.: US 9,436,796 B2
(45) Date of Patent: Sep. 6, 2016

(54) METHOD AND APPARATUS FOR DETERMINING COMMON NODE LOGICAL CONNECTIVITY

(71) Applicant: Avago Technologies General IP (Singapore) Pte. Ltd., Singapore (SG)

(72) Inventor: Stephen Dixon, Fort Collins, CO (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 14/620,043

(22) Filed: Feb. 11, 2015

(65) Prior Publication Data

US 2016/0232274 A1 Aug. 11, 2016

(51) Int. Cl.
*G06F 9/455* (2006.01)
*G06F 17/50* (2006.01)

(52) U.S. Cl.
CPC ................. *G06F 17/5081* (2013.01)

(58) Field of Classification Search
CPC .................................................. G06F 17/5031
USPC .......................................................... 716/113
See application file for complete search history.

(56) References Cited

U.S. PATENT DOCUMENTS

| 5,452,239 A * | 9/1995 | Dai ..................... G06F 17/5027 703/19 |
| 6,421,814 B1 | 7/2002 | Ho |
| 6,442,739 B1 * | 8/2002 | Palermo .............. G06F 17/5031 716/108 |
| 7,676,773 B2 | 3/2010 | Rangasamy et al. |
| 8,117,577 B1 * | 2/2012 | Vadi .................... G06F 17/5031 703/13 |
| 8,219,959 B2 | 7/2012 | Dirks et al. |
| 8,661,388 B2 | 2/2014 | Chen et al. |
| 2003/0051222 A1 * | 3/2003 | Williams ............ G06F 17/5031 716/113 |
| 2009/0288058 A1 * | 11/2009 | Shiring ............... G06F 17/5059 716/104 |
| 2011/0066986 A1 * | 3/2011 | Ekanayake ......... G06F 17/5059 716/103 |

* cited by examiner

*Primary Examiner* — Suresh Memula

(57) ABSTRACT

A method, system, and computer-readable medium are described that enable efficient design processes for integrated circuits. In particular, tools are described which enable an integrated circuit designer to visualize an integrated circuit design without combinational logic and, from such visualization, identify locations in the design of common node logical connectivity. This information enables the designer to identify potential areas where the integrated circuit design can be improved.

23 Claims, 12 Drawing Sheets

METHOD AND APPARATUS FOR DETERMINING COMMON NODE LOGICAL CONNECTIVITY

FIELD OF THE DISCLOSURE

The present disclosure is generally directed toward Integrated Circuits and methods of designing the same.

BACKGROUND

The process of building an Integrated Circuit (IC) or integrated circuit chip typically involves physical implementation followed by verification. Part of this verification process involves static timing analysis. Often times, design changes require that blocks (e.g., components or groupings of components on the integrated circuit) be moved around to address gate growth or to address other floorplan needs. Unfortunately, these changes often have a negative impact on static timing closure. Because timing reports are textual, there is no easy way to see how far blocks can be moved before seeing a negative impact on timing without detailed analysis of the timing reports. This results in trial and error experimentation of various floorplans, which requires significant engineering attention which, in turn, results in wasted machine and license resource use and schedule delay.

BRIEF DESCRIPTION OF THE DRAWINGS

The present disclosure is described in conjunction with the appended figures, which are not necessarily drawn to scale.

DETAILED DESCRIPTION

Figure 1:
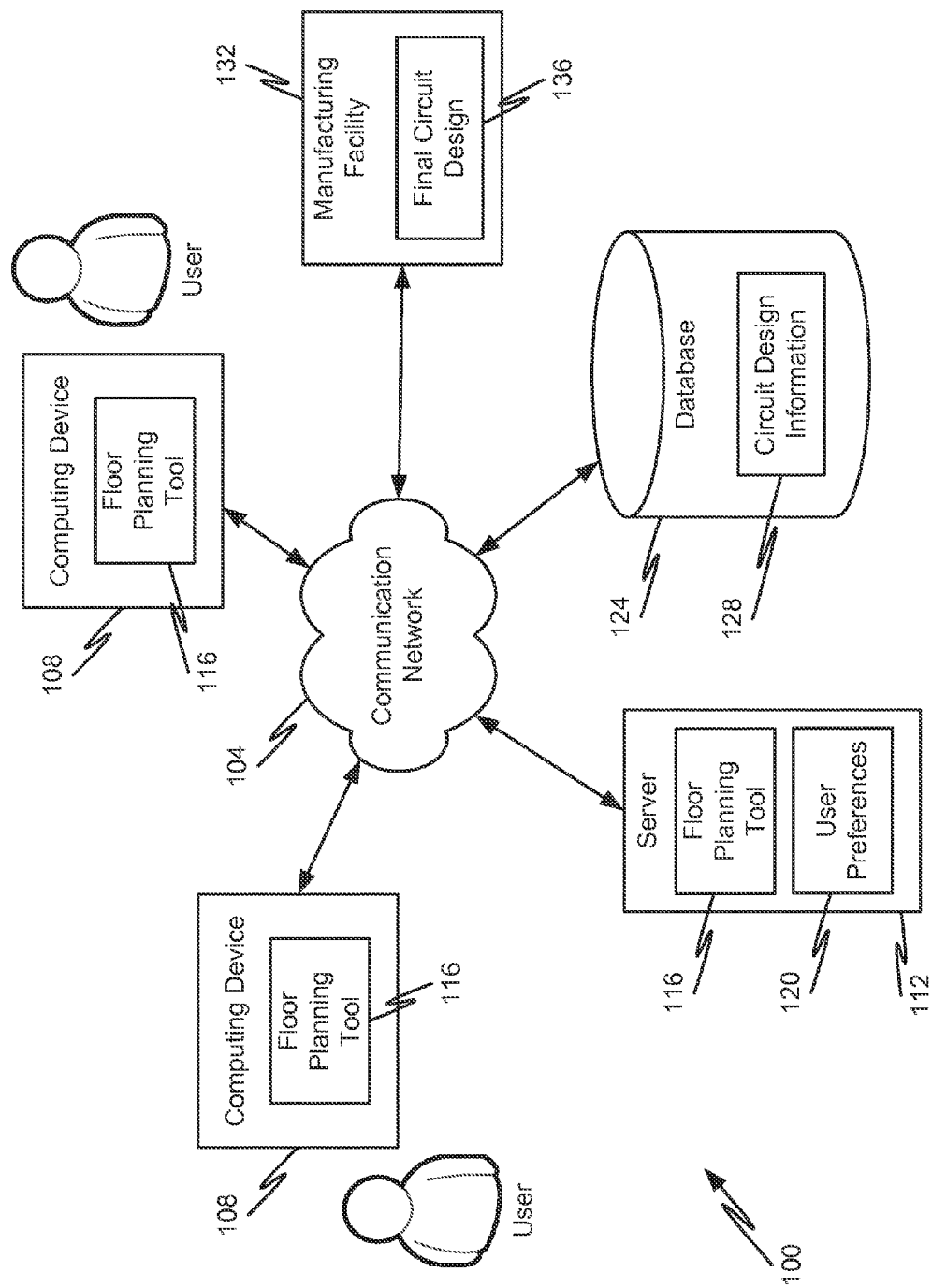
FIG. 1 is a block diagram depicting a communication system in accordance with embodiments of the present disclosure.

The ensuing description provides embodiments only, and is not intended to limit the scope, applicability, or configuration of the claims. Rather, the ensuing description will provide those skilled in the art with an enabling description for implementing the described embodiments. It being understood that various changes may be made in the function and arrangement of elements without departing from the spirit and scope of the appended claims.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

As used herein, the singular forms "a," "an," and "the" are intended to include the plural forms as well, unless the context clearly indicates otherwise. It will be further understood that the terms "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

While embodiments of the present disclosure will be described in connection with the design of integrated circuits and integrated circuit chips, it should be appreciate that embodiments of the present disclosure can be applied to any design process where modification of one variable (e.g., physical position of an element or component in a system) impacts another variable (e.g., communication delays between components of the system). For instance, embodiments of the present disclosure may be utilized in networking chip designs, microprocessor designs, board designs, and the like.

Integrated circuits consist of a large number of electronic components that are fabricated by layering several different materials on a silicon base or wafer. The physical design of an integrated circuit transforms a circuit description into a geometric description which is known as a layout. A layout consists of a set of planar geometric shapes in several layers.

The objective of physical design is to determine an optimal arrangement of devices in a plane or in a three dimensional space, and an efficient interconnection or routing scheme between the devices to obtain the desired functionality. Since space on a wafer is very expensive real estate, algorithms must use the space efficiently to lower costs and improve yield.

The input to the physical design problem is a circuit diagram, and the output is the layout of the circuit. The physical design is accomplished in several stages including partitioning, floor-planning, placement, and routing.

A chip may contain several billion transistors. Layout of the entire circuit cannot typically be handled by currently available floor-planning tools due to the limitation of memory space as well as the computational power available. Therefore, the circuit is normally partitioned by grouping the components into functional blocks such as subcircuits and modules. The actual partitioning process considers many factors such as the size of the blocks, number of blocks and number of interconnections between the blocks. As used herein, any element presented on an integrated circuit design will be referred to as an object. There are multiple types of objects that may be represented for a circuit design including, without limitation, blocks, modules, macros, cells, and transistors themselves. The transistors are the actual components that are built onto the silicon of a chip. The cell represents the first level of abstraction for transistors. A cell may contain one or multiple transistors therein and may have a particular function (usually a simple logic function) associated therewith (e.g., AND, OR, NOT, XOR, NOR, NAND, sum, compare, multiply, amplify, etc.). A macro may correspond to the next level of abstraction and may include one or multiple cells. In other words, a macro may correspond to a more complicated representation of multiple cells where each cell represents one or multiple transistors. Like cells, a macro may have certain functions associated therewith and those functions are usually more complex than the functions associated with the cells contained therein. Registers and pins may also correspond to a similar level of abstraction as the macro. A module may correspond to the next level of abstraction and may include one or multiple macros. A module may also include one or more registers, cells, and/or pins along with the macros. A module may have more complex functions associated therewith than the functions of macros (e.g., feedback loops, logic loops, data decelerators, data accelerators, buffers, etc.). A block may correspond to the next level of abstraction and may include multiple modules, macros, and/or cells. Blocks may be grouped and spaced on a chip and may have the highest complexity functions associated therewith. Examples of blocks that may be included in a chip include Ser/Des blocks, encoding blocks, decoding blocks, filter blocks, buffer memory blocks, and the like.

The output of partitioning is a set of blocks, along with the interconnections required within and between blocks. The set of interconnections required is referred to as a netlist. In large circuits, the partitioning process is often hierarchical, although non-hierarchical (e.g. flat) processes can be used, and at the topmost level a circuit typically has between a few and hundreds of blocks. However, greater numbers of blocks are possible and contemplated. Each block is then partitioned recursively into smaller blocks or sub-blocks as described above. For instance, blocks may be partitioned into modules, which may be partitioned into macros, which may be partitioned into cells, etc.

The floor-planning step is concerned with selecting good layout alternatives for each block of the entire chip, as well as between blocks and to the edges. Floor-planning is an important step as it sets up the ground work for a good layout. However it is computationally quite hard. Very often the task of floorplan layout is done by a design engineer using a CAD tool. This is necessary as the major components of an integrated circuit are often intended for specific locations on the integrated circuit.

During placement, the blocks and locations of the block terminals, referred to hereinafter as block "ports", within the blocks are exactly positioned on the chip. The goal of placement is to find a minimum area arrangement for the blocks that allows completion of interconnections and timing requirements defined by the netlist. Placement is typically done in two phases. In the first phase, an initial placement is created. In the second phase, the initial placement is evaluated and iterative improvements are made until the layout has minimum area and conforms to design specifications.

It is one aspect of the present disclosure to provide an integrated circuit designer with a method of minimizing the amount of time spent during both phases of design. In the first phase, the tool proposed herein can be used to create an initial macro/object placement that is optimized for the extracted macro, register, common node and block port connectivity, as well as timing information. This placement can be used for the first pass through the logic cell placement, route, and timing analysis. Also, the designer can decide to view connectivity through the GUI and make any placement adjustments they desire based on their analysis of the connectivity. By providing an optimized starting point, the iterations in the second phase are greatly reduced. Specifically, embodiments of the present disclosure enable an initial chip design to be flattened and have the combinational logic removed therefrom, thereby leaving only interconnections between synchronous cells of the chip design. This simplification of the chip design enables a simplified but useful visualization of the chip design. Moreover, with the combinational logic removed from the chip design, important and useful analysis can be performed on the object-to-object connections. For instance, common nodes and extended timing paths of the chip design can be quickly identified and presented to the designer, thereby enabling the designer to determine what types of changes to the chip design are possible and could render the most useful utilization of chip space.

In accordance with at least some embodiments of the present disclosure, a floor planning tool is provided as executable programming code (e.g., software, firmware, hardware, combinations thereof) on a client device and/or a server. The floor planning tool can be configured to perform one, many, or all of the functions, processes, or methods described herein.

Referring now to FIG. 1, a system 100 for assisting with the design and configuration of integrated circuits and similar systems will be described in accordance with at least some embodiments of the present disclosure. The system 100 may include a communication network 104, one or more computing devices 108, one or more servers 112, and one or more databases 124. The communication network 104 may further provide communication capabilities between the computing devices 108 and/or servers 112 and a manufacturing facility 132.

The communication network 104 may correspond to any type of well-known computing or network environment (e.g., interconnection of two or more computing or communication devices). The communication network 104 may facilitate communications between all devices connected therewith using any type of known communication protocol. In accordance with at least some embodiments of the present disclosure, the communication network 104 may comprise any type of known communication medium or collection of communication media and may use any type of protocols to transport messages between endpoints. The communication network 104 may include wired and/or wireless communication technologies. The Internet is an example of the communication network 104 that constitutes and Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a LAN, a WAN, a Session Initiation Protocol (SIP) network, a Voice over IP (VoIP) network, a cellular network, an enterprise network, a contact center, and any other type of packet-switched or circuit-switched network known in the art. In addition, it can be appreciated that the communication network 104 need not be limited to any one network type, and instead may be comprised of a number of different networks and/or network types. Moreover, the communication network 104 may comprise a number of different communication media such as coaxial cable, copper cable/wire, fiber-optic cable, antennas for transmitting/receiving wireless messages, and combinations thereof.

In some embodiments, a computing device(s) 108 may include a personal communication device, a dedicated computing device, or a combined communication/computational device. Examples of suitable computing devices 108 include, without limitation, a Personal Computer (PC), a tablet, a laptop, a Personal Digital Assistant, a thin client, a smartphone, or the like. The computing device 108 may be configured for operation by one or more users and may include local software and drivers that enable the user to utilize the processing and/or memory components of the computing device 108. Thus, the computing device 108 may include one or more user interface components including user inputs, user outputs, and combined user input/output devices.

The server 112 may include any type of dedicated processing component that is accessible to one or a plurality of computing devices 108 (e.g., client devices). The server 112 may store one or more instances of executable instructions thereon and the computing devices 108 may request the server 112 to execute some or all of those instructions on behalf of the computing device 108. Results of such computations can be provided to the computing device 108 via the communication network 104, which can then be rendered for presentation to the user via a user interface of the computing device 108.

The database 124 may include one or multiple types of data storage technologies. The database 124 may further include a database interface that enables the computing devices 108 and/or server 112 to interact with the database 124, store information on the database 124, retrieve information from the database 124, modify information stored on the database 124, etc. Suitable non-limiting examples of databases 124 that may be used to circuit design information 128 and/or any other content that is useful in the process of designing integrated circuits and layouts for the same include a hierarchical database, a graph database, a relational database, a network database, an object-oriented database, or the like. The database interface for the database 124 may utilize a language or format that is operable to extract useful information from the database 124. Examples of languages that may be used by the database interface include, without limitation, SQL, noSQL, NewSQL, and/or any other type of Database Management System (DBMS) known in the art.

As shown in FIG. 1, a computing device 108 and/or server 116 may be provided with a floor planning tool 116. As will be discussed in further detail with respect to FIG. 2, the floor planning tool 116 may be stored as processor-executable instructions in memory of the computing device 108 and/or server 112. The floor planning tool 116, when executed, may enable a user of the computing device 108 to create, modify, and analyze floorplans or layouts for integrated circuits.

The floor planning tool 116 may include instructions programmed to perform the floor planning process(es) described herein. Typically, the floor planning process can be implemented as a set of procedures in Tool Command Language (TCL), which is a well known scripting language. The floor planning tool 116, in some embodiments, performs the floor planning and block partitioning processes in a known manner. As will be described in further detail herein, during design iterations, the floor planning tool 116 may be configured to determine space constraints, timing constraints, common node connectivity, extended path issues, connectivity issues, and other data regarding a chip design. The floor planning tool 116 may also be configured to present the chip design in a number of different ways to help the user identify such issues and perform optimal design iterations, thereby minimizing design time and resources.

In particular, a user may be allowed to retrieve circuit design information 128 in the form of a netlist or the like that defines the blocks to be included in an integrated circuit design and the physical layout of such blocks and/or sub-blocks on the silicon of the integrated circuit. With the floor planning tool 116, the user of the computing device 108 may further be enabled to modify the floorplan, analyze timing constraints, analyze space constraints, identify constraining connections between blocks and macros contained within block, and so on, for. As the layout of the integrated circuit is changed, the floor planning tool 116 may enable the user of the computing device 108 to visualize, in real-time or near-real-time, changes to the timing margins, space constraints, etc. for various object-to-object connections and how changes to block layout impact or deteriorate performance of the integrated circuit. By enabling the user to see such impacts of layout modification in real-time or near-real-time, the user is allowed to more efficiently develop an optimal and workable integrated circuit design.

One advantage to using the server 112 to implement the floor planning tool 116 is that superior processing resources of the server 112 or a server cluster may be leveraged to execute what is often a processor-intensive application in the floor planning tool 116. In particular, the circuit design information 128 that is read and modified via the floor planning tool 116 is often on the order of tens to hundreds of Gigabytes or more. Another advantage to using the server 112 is that user preferences 120 can be stored on the server 112, thereby enabling each user to have their visualization and presentation preferences accommodated even though shared resources of the server are being utilized by multiple users. The server 112 further facilitates efficient collaboration among users, thereby assisting in the team development of an optimal integrated circuit design. In some embodiments, the user preferences 120 may define each user's presentation preferences, each user's tool preferences, each user's input preferences, administrator preferences, sharing preferences, and the like.

As can be appreciated, the ultimate goal of using the floor planning tool 116 is to achieve a final circuit design 136. When such an integrated circuit design is finalized, the final version of the circuit design information 128 may be shared from the database 124 to a manufacturing facility 132 thereby enabling the production of one or more integrated circuits in accordance with the final circuit design 136.

Figure 2:
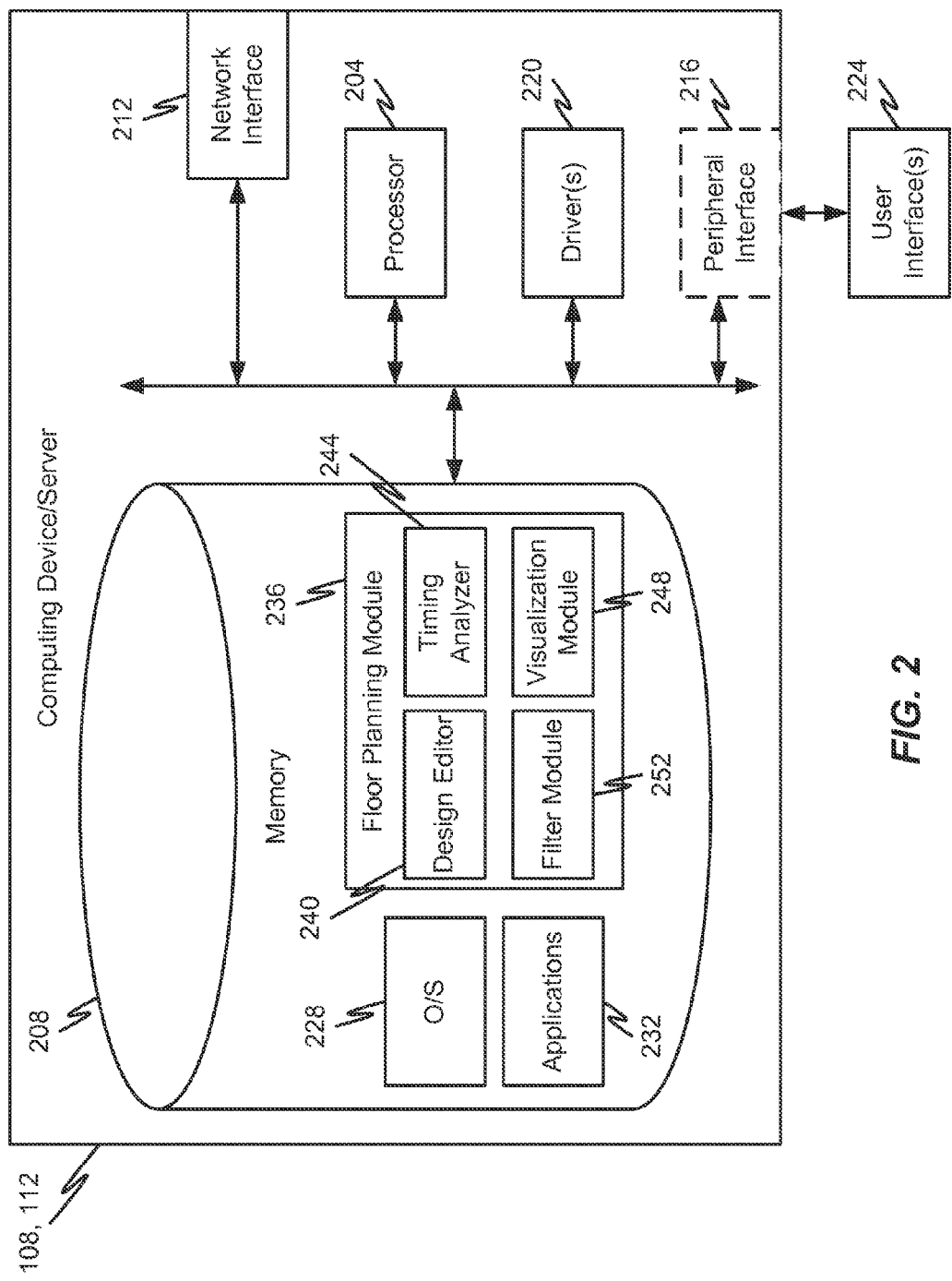
FIG. 2 is a block diagram depicting details of a computing device and/or server in accordance with embodiments of the present disclosure.

With reference now to FIG. 2, additional details of a computing device 108 and/or server 112 will be described in accordance with at least some embodiments of the present disclosure. It should be appreciated that some or all of the components depicted in FIG. 2 can be entirely resident on a computing device 108, entirely resident on a server 112, split among a computing device 108 and server 112, or shared among a computing device 108 and server 112. The illustrated computing device 108 and/or server 112 is shown for explanation purposes only and is not intended to limit the location of any component thereof to a particular device in the system 100. To the contrary, the components depicted in FIG. 2 may be provided on one, some, or all of the devices in the system 100 without departing from the scope of the present disclosure.

The device 108/server 112 is shown to include a processor 204, memory 208, a network interface 212, an optional peripheral interface 216 (in the implementation of a computing device 108), and one or more drivers 220. The memory 208 may include any type or combination of known computer memory devices, whether volatile or non-volatile. Suitable non-limiting examples of memory 208 include Read Only Memory (ROM), Random Access Memory (RAM), Flash Memory, Buffer Memory, Electronically Programmable ROM (EPROM), Electronically Erasable Programmable ROM (EEPROM), magnetic memory, optical memory, quantum memory, variants thereof, or the like. In other words, the format of memory 208 may include any known or yet-to-be-developed memory format.

The instructions stored in memory 208 may be called, parsed, and executed by the processor 204. The processor 204, in some embodiments, includes one or more processors. More specifically, the processor 204 may include one or more microprocessors that are capable of executing the instructions stored in memory 208. The processor 204 may also have internal memory that assists the processor 204 in executing instructions and performing various tasks. Although the contents of memory 208 are shown and primarily described as processor-executable instructions (e.g., software), it should be appreciated that the floor planning tool 116, the floor planning module 236, and other instructions shown to be stored in memory 208 may be partially or completely implemented in software, firmware, hardware, combinations thereof, or the like.

The network interface 212 provides the device 108/server 112 to connect with the communication network 104 and, therefore, interact with other computing devices 108 and servers 112 as well as other network-connected components (e.g., databases, other networks, etc.). The network interface 212, in some embodiments, may correspond to a wired network interface port or wireless interface (e.g., antenna and drivers). Some non-limiting examples of a wired network interface port correspond to an Ethernet port, a CAT-5 port, a CAT-6 port, or the like. Some non-limiting examples of a wireless network interface port corresponds to a Bluetooth® interface, a 802.11N interface (e.g., a WiFi interface), a cellular interface, an Infrared interface, or the like.

The peripheral interface 216 may be optionally provided in the implementation of a computing device 108, although a server 112 may also be equipped with one or more peripheral interfaces 116. The peripheral interface 216 provides an interconnection between components of the computing device 108 and external devices (e.g., peripherals). Peripheral devices most likely used in connection with embodiments of the present disclosure include one or more user interface 224 peripherals. The user interface(s) 224 may include user input devices (e.g., a mouse, pointer, keyboard, stylus, microphone, camera, etc.), user output devices (e.g., a printer, a speaker, a visual display such as an LCD or LED monitor, lights, buzzers, etc.), and/or combination user input/user output devices (e.g., touch-sensitive displays).

The driver(s) 220 may be configured for specific components of the device 108/server 112. As an example, each network interface 212 may have a corresponding driver 220, each peripheral interface 216 or specific peripheral device connected thereto may have a corresponding driver 220, and each user interface 224 may have a corresponding driver 220. The driver(s) 220 enable operation of the various components by control of the processor 204 when executing certain basic functions of the device 108/server 112.

As shown in FIG. 2, the memory 208 may include one or many different types of executable instruction sets. The illustrated examples of such instructions include an Operating System (O/S) 228, other applications 232, and a floor planning module 236. The floor planning module 236 may correspond identically to the floor planning tool 116 or to a component thereof.

The O/S 228 may correspond to a general-purpose application that enables a user of the device 108 to access other applications 232 and the floor planning tool 236. The O/S 228 may also include functionality that enables navigation of documents stored in memory 208 as well as an interface with database 124. Examples of suitable O/S 228 include, without limitation, Windows®, Linux, Mac O/S, Android®, IOS®, or the like. The O/S 228 may even be configured to include some or all functionality of the floor planning module 236 without departing from the scope of the present disclosure.

The other applications 232 may correspond to any type of known or yet-to-be-developed applications, scripts, applets, web-based applications, or the like. The applications 232 may include communication applications (e.g., phone applications, web browser applications, searching applications, email applications, text applications, etc.), integrated circuit design applications, collaboration applications, or the like.

The floor planning module 236 is shown to include a number of modules and components therein that help provide the functionality of the floor planning module 236. The illustrated components of the floor planning module 236 include a design editor 240, a timing analyzer 244, a filter module 252, and a visualization module 248. The design editor 240 may correspond to a portion of the floor planning module 236 that enables a user to view, create, add, modify, delete, or otherwise interact and edit integrated circuit layouts. The design editor 240 may provide editing tools and tools for presenting the current layout of an integrated circuit as well as tools for modifying locations or properties of blocks on the layout of the integrated circuit.

The timing analyzer 244 may provide the floor planning module 236 with the ability to analyze connections on some or all of an integrated circuit layout. The timing analyzer 244 may perform such analysis in real-time (e.g., as changes are made to the layout with the design editor 240), in near-real-time (e.g., after changes are made to the layout but before committed to a circuit design iteration stored in the database 124), or after a layout has been saved to the database 124. As will be discussed in further detail herein, the timing analyzer 244 may be configured to determine timing information for objects and object-to-object connections, associate such timing information with the appropriate objects and object-to-object connections, and present the timing information to a user in an easy to understand format. The analyzer 244 may perform other tasks as described herein such as determining constraining connections between objects, grouping objects or connections based on similarity of characteristics, calculating extended path statistics, identifying common nodes within the chip design, etc. With the help of the visualization module 248, the presentation of information obtained from the analyzer 244 can be provided all at once or selectively, perhaps depending upon user preferences 120. In some embodiments, the visualization module 248 may help highlight certain objects or object-to-object connections that have information associated therewith that may be of interest or concern to the user. The way in which such information is highlighted or presented to a user may include highlighting interesting objects and/or connections, hiding of non-interesting objects and/or connections, highlighting particular pins of objects, preparing reports in an ordered fashion, or the like.

The filter module 252 may provide another mechanism for the user to view and refine views of an integrated circuit layout and, in particular, to query the entire layout for objects or connections having certain properties (e.g., timing properties) associated therewith. The filter module 252 may also provide the ability to limit the amount of information presented to a user to only a subset of timing information that is deemed relevant and useful to the user at a particular time (e.g., as determined by a user's query for such information or as determined by the user's current utilization of the floor planning module 236).

Figure 3A:
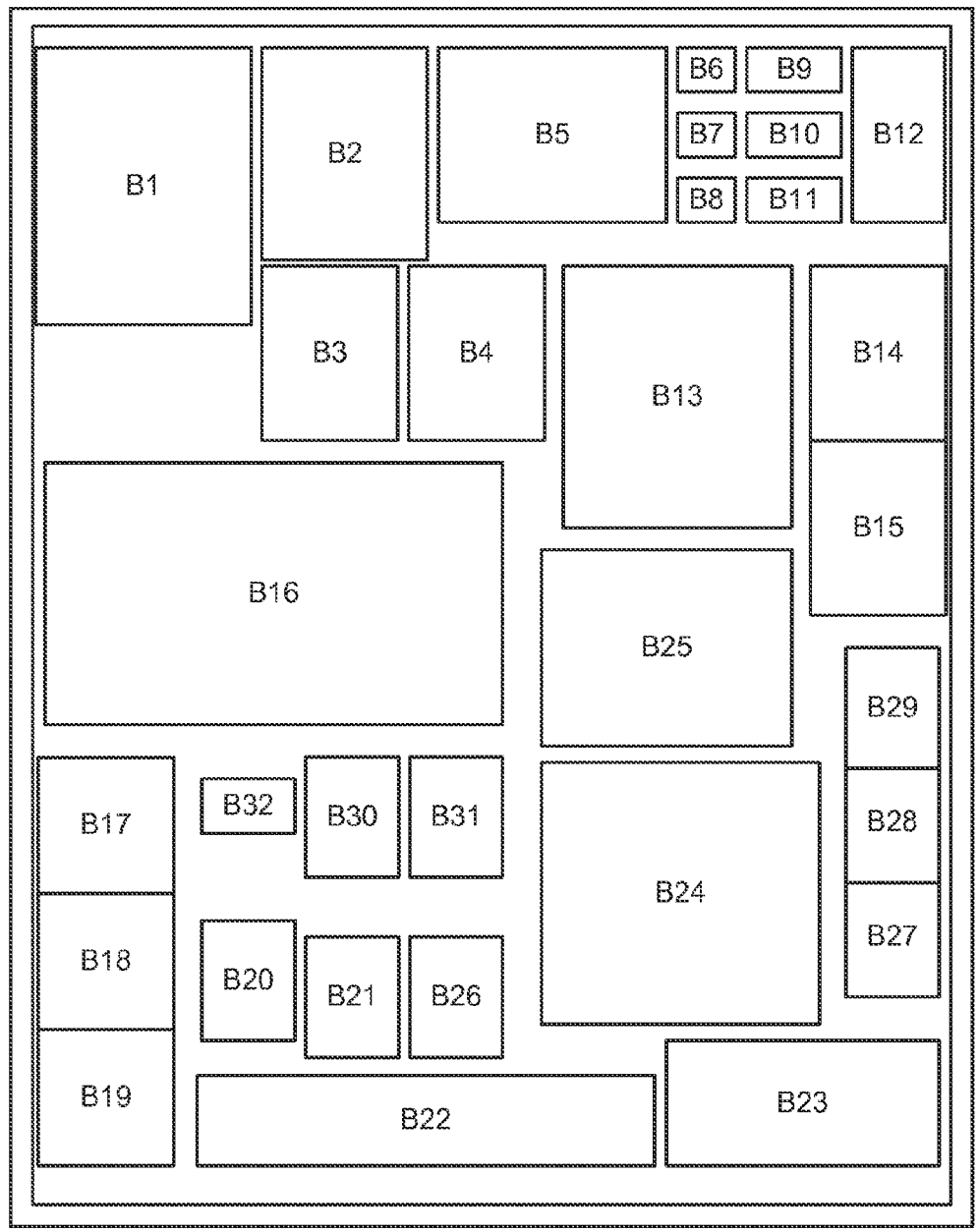
FIG. 3A is a block diagram depicting an illustrative integrated circuit layout in accordance with embodiments of the present disclosure.

With reference now to FIGS. 3A-3F, further examples of a user's experience and interaction with the floor planning module 236 will be described in accordance with at least some embodiments of the present disclosure. The floorplan or integrated circuit layout depicted in FIG. 3A shows a plurality of blocks B1-B31 physically distributed in a non-overlapping fashion. Although a particular number of blocks B1-B31 are depicted, it should be appreciated that embodiments of the present disclosure may be utilized for an integrated circuit layout having any number of objects, including a single block and a port, for example.

Figure 3B:
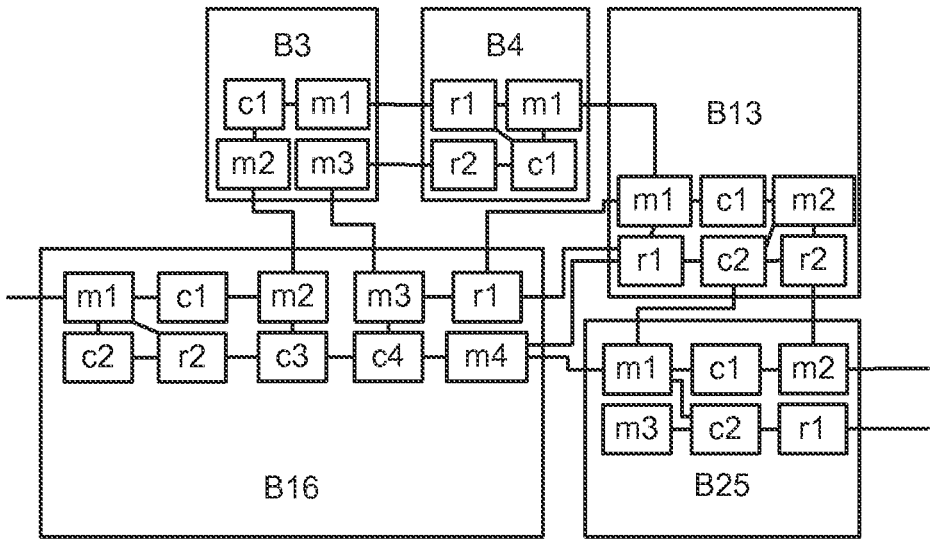
FIG. 3B is a first detailed view of objects and object-to-object connections in the integrated circuit layout of FIG. 3A.

FIG. 3B shows a detailed view of a subset of blocks shown in FIG. 3A. In particular, blocks B3, B4, B13, B16, and B25 are shown for illustrative purposes. As used herein, the blocks may correspond to one type of object that can be analyzed by the timing analyzer 244. Other sub-components of the blocks (e.g., modules, macros, cells, registers, etc.) may also be referred to as objects. It should also be appreciated that combinational logic components may be considered objects, but such components may be flattened or ignored for certain types of analyses and/or presentations of the chip design.

The blocks are shown to include one or more macros (m1, . . . , etc), one or more registers (r1, r2, . . . , etc.), one or more combinational logic components (c1, c2, . . . , etc.), and connections therebetween. As can be appreciated, blocks and components thereof may each have interconnections therebetween and even the macros and registers may not correspond to the lowest-level of component on the integrated circuit layout. Instead, the macros and registers may comprise or represent a plurality of digital processing components or circuits that are designed to perform a particular sub-routine within the larger block. Some blocks may have only two components whereas other blocks may have a larger number of components. The complexity of the function performed by a block may be associated with the number of sub-blocks contained therein, although a direct correlation is not required. While the blocks depicted in FIG. 3B do not explicitly show pins or ports, it should be appreciated that blocks may also include one or both of pins or ports for connecting to other blocks and/or outside the chip. As will be described herein, the timing analyzer 244 may be configured to ignore or bypass combination logic of the chip design and create a representation (e.g., a graph-based representation) of only the connectivity between synchronous cells (e.g., macros and registers), ports, and pins of the chip. All other non-synchronous cells (e.g., components that do not have a timing requirement) may be ignore and/or bypassed for certain types of analysis and/or presentation of the chip design, thereby enabling the user to more efficiently view the objects that have timing requirements and ignore those objects that do not have timing requirements.

Figure 3C:
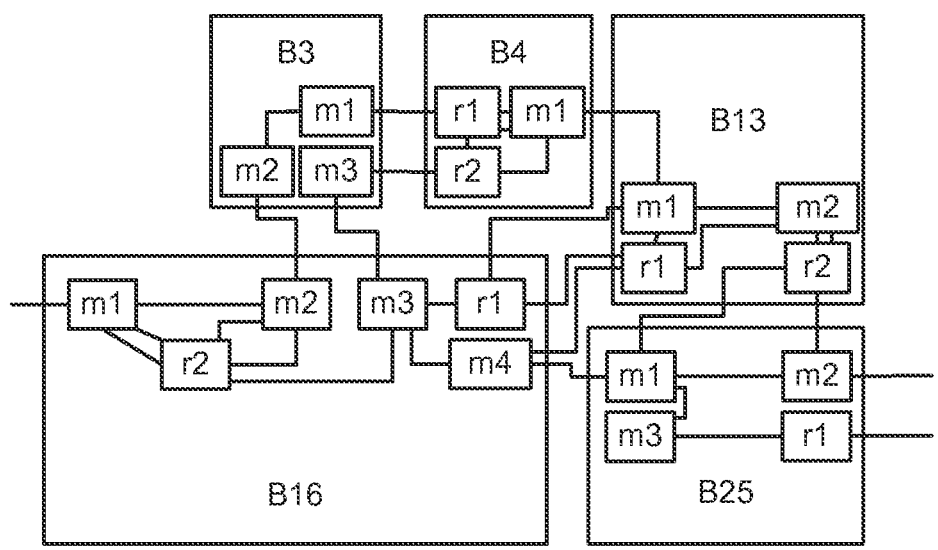
FIG. 3C is a second detailed view of objects and object-to-object connections in the integrated circuit layout of FIG. 3A.

Thus, as shown in FIG. 3C, as part of simplifying a display of connections for a user of the floor planning module 236, the visualization module 248 in cooperation with the timing analyzer 244 may remove, hide, or otherwise shift focus away from the non-synchronous cells and present a view of the blocks with the combinational logic removed therefrom. As used herein, the term "combinational logic" refers to any type of logic or logic components that has one or more nonsynchronous cells positioned between two synchronous cells/objects. What remains then are the synchronous cells/objects and the connections therebetween. It should be appreciated that there may be one or more connections between any given pair of synchronous cells, particularly when the combinational logic is removed from the view of the chip design. Bypassing of the combinational logic also enables the timing analyzer 244 to identify additional useful information regarding the chip design such as common nodes, extended timing paths, and the like.

Figure 3D:
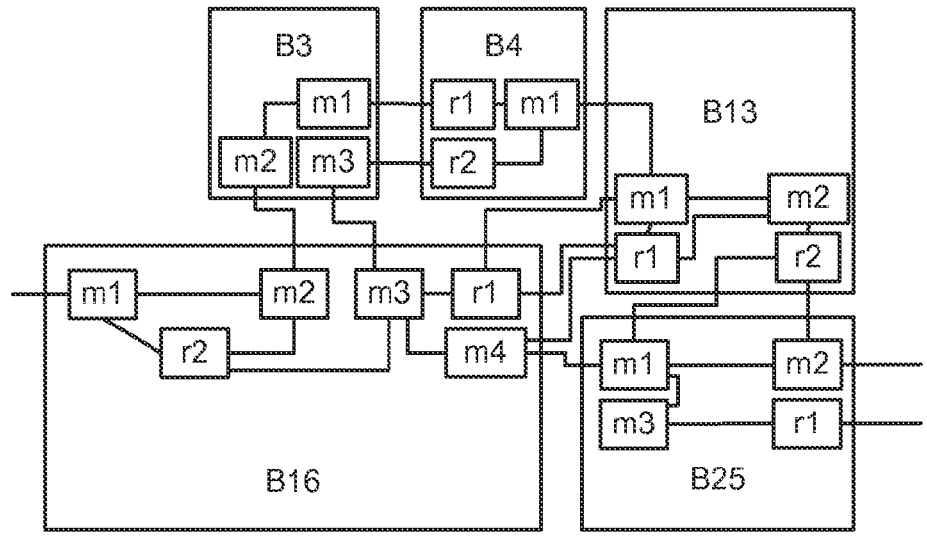
FIG. 3D is a third detailed view of objects and object-to-object connections in the integrated circuit layout of FIG. 3A.

As shown in FIG. 3D, visualization of the integrated circuit layout may be further simplified to only depict the most constraining object-to-object connections in the layout. Other non-constraining connections may be hidden, deleted, or otherwise have focus shifted away therefrom to help the user of the floor planning module 236 to identify the most constraining connections for a pair of objects in the integrated circuit layout. Moreover, as shown in FIG. 3D, the constraining connections may be displayed as flylines or some other indicator other than the physical connections between the blocks to further help ease the identification of the constraining block-to-block connections.

Figure 3E:
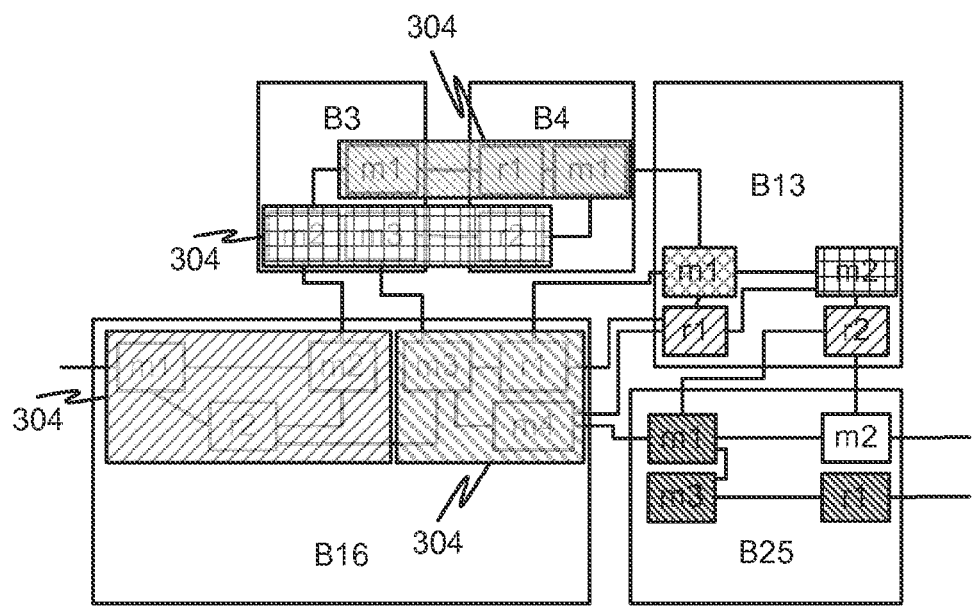
FIG. 3E is a fourth detailed view of objects and object-to-object connections in the integrated circuit layout of FIG. 3A.

Further still, as shown in FIG. 3E, each object or each object-to-object connection may be presented in accordance with a particular presentation format, which may depend upon properties of the object, properties of connections between objects, properties of groups of objects, and so forth. For instance, a highly constrained connection may be depicted in one way whereas a connection that is violating timing margins or timing requirements may be depicted in a different way. As another example, objects may be grouped 304 in common groups and have common highlighting or presentation thereof. A group 304 of objects may correspond to objects having similar properties (e.g., timing constraints), objects having a connection to a common node (e.g., are driving or being driven by a common single object), common nodes, objects having similar timing constraints, etc. It should also be appreciated that objects can be identified by groups without drawing a box around the defined group. For instance, a common highlighting or presentation technique may be used for objects or connections belonging to a common group. By presenting flylines and/or objects in different ways based upon the properties thereof, the user of the floor planning module 236 is able to quickly identify whether certain objects can be moved relative to other objects in addition to determining whether certain changes to object layout negatively or positively impact timing performance of the overall integrated circuit. As can be appreciated, a particular flyline or object presentation (e.g., color, type, weight, etc.) may be used to depict such objects and object-to-object connections having similar properties.

Figure 3F:
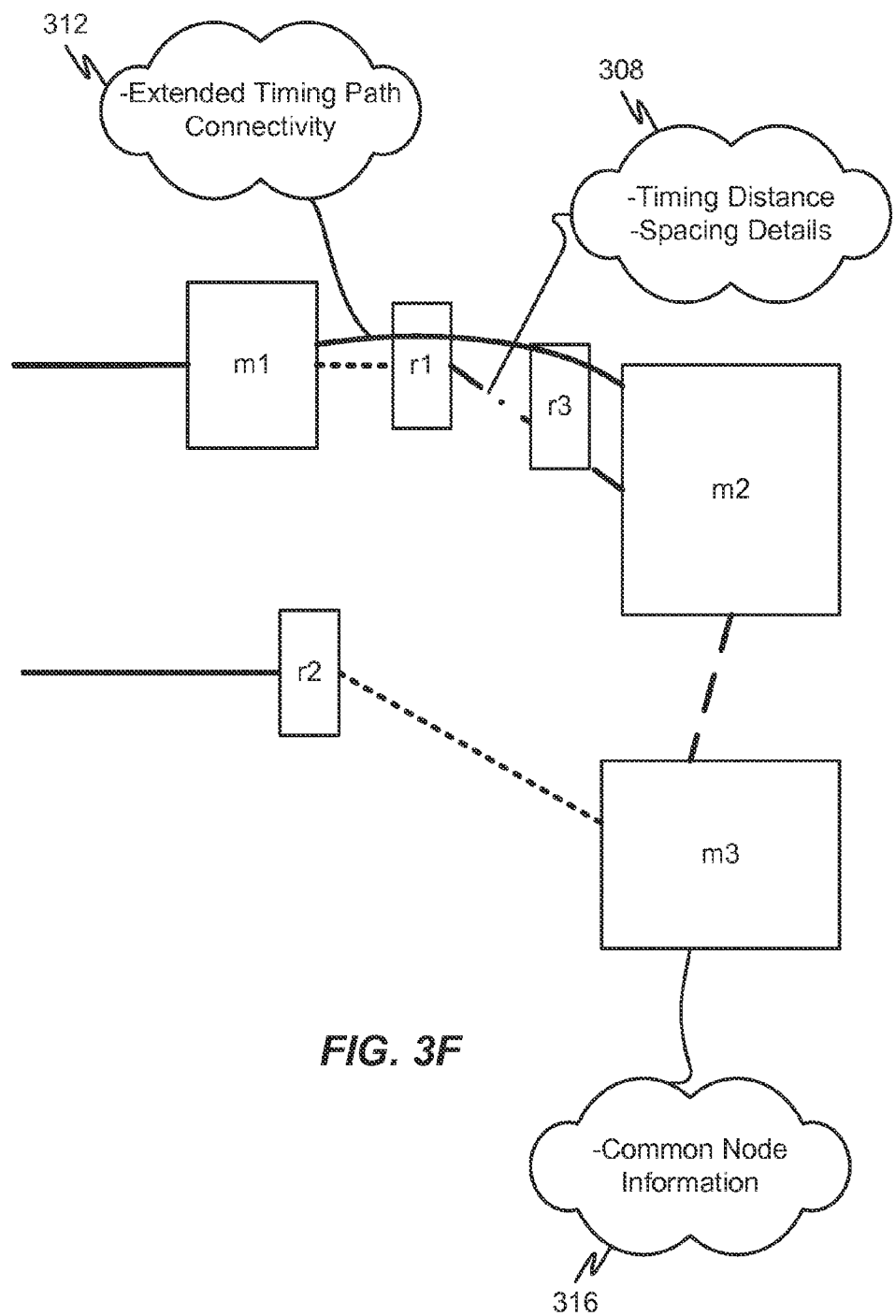
FIG. 3F is a fifth detailed view of objects and object-to-object connections in the integrated circuit layout of FIG. 3A.

With reference to FIG. 3F, a user may be further enabled to query or select a particular flyline or object to determine timing and spacing information 308 associated therewith. The user may also be able to visualize extended timing path connectivity 312 (e.g., paths and timing constraints for connections that traverse more than two objects). Furthermore, the visualization module 248 may enable the user to view and quickly identify locations of common nodes 316 (e.g., nodes or objects that are driving or being driven by two or more objects). Because the visualization module 248 may present the chip design with the combinational logic bypassed, any object having three or more flylines or connections thereto is most likely a common node. Furthermore, a user may be enabled to use the filter module 252 to define information that is desired to be depicted in any of the informational elements 308, 312, 316 and, in response to receiving such information, the connections or objects meeting the search criteria may be displayed whereas other connections or objects not meeting the search criteria may not be displayed or may be displayed in a differentiating way.

As discussed hereinabove, the floor planning module 236 may be configured to perform one or many processes to help the chip designer minimize design iterations and efficiently arrive at a final circuit design 136. With reference now to FIGS. 4-11 various processes which may be performed by the floor planning module 236 will be described in accordance with at least some embodiments of the present disclosure. It should be appreciated that the floor planning module 236 may be configured to perform some, most, or all of the processes depicted and described in connection with FIGS. 4-11. Moreover, the floor planning module 236 may perform any of the processes or steps thereof sequentially, in parallel, or in any other order.

Figure 4:
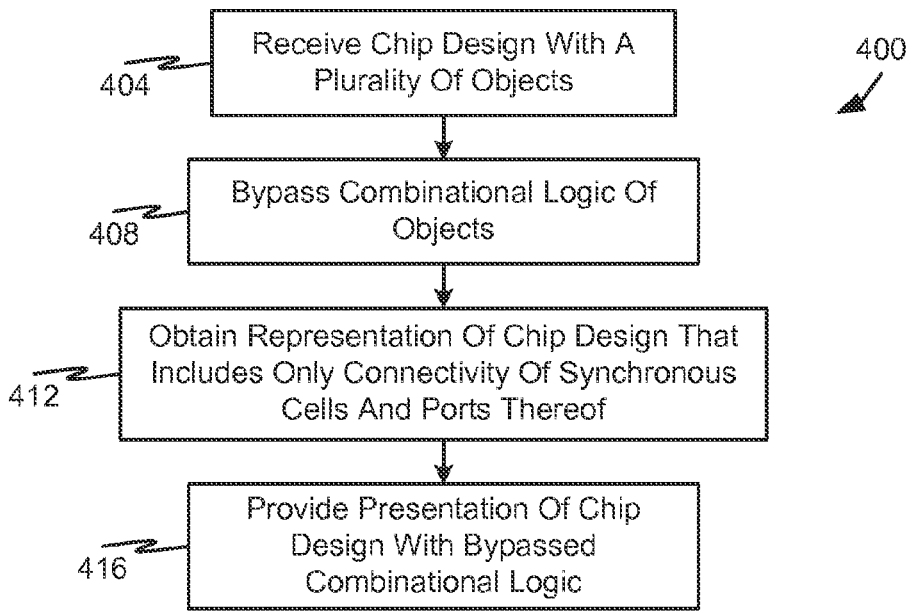
FIG. 4 is a flow diagram depicting a method of presenting a chip design with combination logic bypassed in accordance with embodiments of the present disclosure.

Referring initially to FIG. 4, a process 400 of presenting a chip design with combination logic bypassed will be described in accordance with embodiments of the present disclosure. The process 400 begins when the floor planning module 236 receives a chip design having a plurality of objects and their locations defined therein (step 404). The chip design may be received as circuit design information 128 from the database 124. The floor planning module 236 then utilizes the timing analyzer 244 to bypass combinational logic of the chip design (step 408). In other words, the combinational logic is ignored and connections between objects having timing requirements (e.g., synchronous cells) without the combinational logic is determined. This information is used to obtain a representation of the chip design that includes only connectivity of the synchronous cells, ports, and pins thereof (step 412). This information is provided to the visualization module 248 which provides a presentation of the chip design with the bypassed combinational logic (step 416). In some embodiments, the synchronous cells are not moved from their original locations in the revised presentation of the chip design, but the presentation of objects is greatly simplified because only those objects having timing requirements are presented and the combinational logic is no longer visible to the user. This type of presentation of the chip design enables the user to more easily identify how synchronous cells are connected to one another and, as will be discussed in further detail herein, where potential timing constraints are positioned on the chip design.

Figure 5:
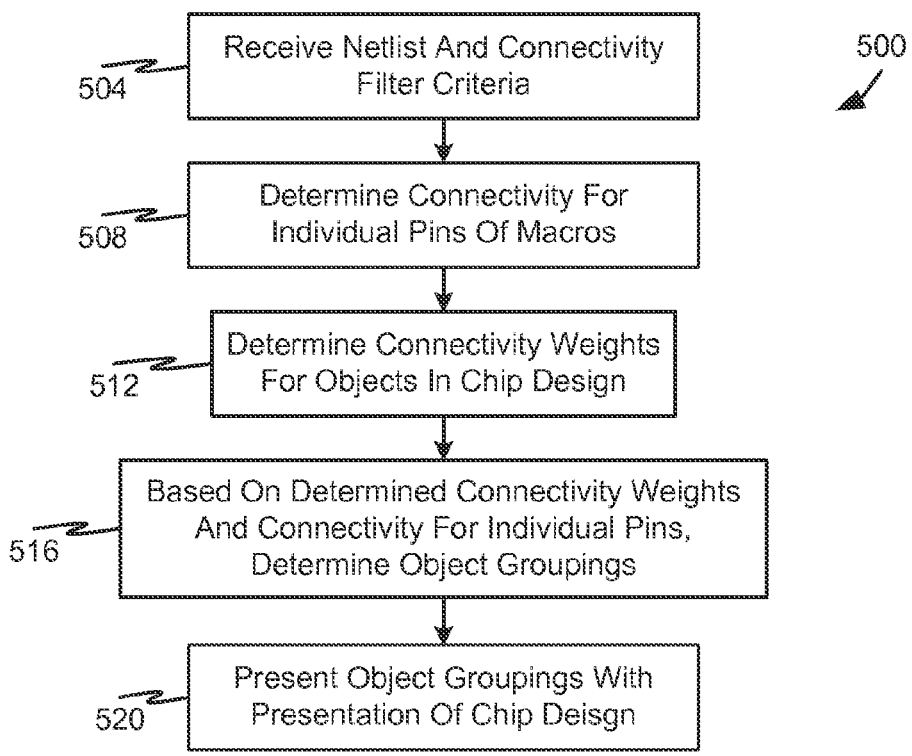
FIG. 5 is a flow diagram depicting a method of determining and presenting object groupings for a chip design in accordance with embodiments of the present disclosure.

With reference now to FIG. 5, a process 500 of determining and presenting object groupings for a chip design will be described in accordance with embodiments of the present disclosure. The process 500 begins with the analyzer 244 receiving the netlist (e.g., a definition of the chip, chip components, and design requirements) along with any connectivity filter criteria defined by the user of the floor planning module 236 (step 504). In some embodiments, the user can define filter criteria for the connectivity analysis so that processing resources are not wasted on analyzing every single connection in the netlist. For example, if the user does not want the module 236 to extract connectivity for test logic paths or reset paths (which tend to be connected to all macros and can make the connectivity data less useful for the user), the user can specify the exclusion of such connections so that the data extracted from the netlist does not contain the undesired connectivity. This functionality is useful to help improve the overall experience for the user as well as minimize processing wait times during extraction.

The method continues with the floor planning module 236 employing the analyzer 244 to determine connectivity for individual pins of macros (step 508). The pin connectivity is also useful for determining object orientation relative to each other. Also, the number of connections between two objects can be used as a guide for indicating how much combinational logic resides between the two objects. With a high value for the number of connections, even though the objects would want to be close, the designer must also consider the need for sufficient spacing between objects for the placement and routing of the combinational logic therebetween. The connectivity weights for the individual pins may be determined in a similar fashion to the way that connectivity weights are determined for objects (e.g., based on number of connections, number of states of latency, and timing distance), as will be discussed in further detail herein. It should also be appreciated that the data listed for use in connection with determining connectivity weights can be used for other purposes. Accordingly, the illustrative uses of such data provided herein is not meant to be an exhaustive list of the way such data can be used.

Thereafter, the process 500 continues with the analyzer 244 determining connectivity weights for objects in the chip design (step 512). Connectivity weights are defined as an amount or degree of connectivity between two objects. The calculation of connectivity weights can be done without bypassing the combinational logic of the chip design, but becomes much easier and computationally efficient if the combinational logic of the chip is bypassed since connectivity weights are calculated as a function of a number of timing-based and non-timing-based factors which are not likely impacted by combinational logic.

For instance, two objects may be defined as having a high connectivity weight if they are determined to be highly connected based two or more of the following factors being true: (1) have more than one connection therebetween; (2) have multiple states of latency therebetween; (3) have a small timing distance (e.g., a requirement that no more than 3 clock cycles can pass before information travels from one object to the other object); and (4) have one or more common nodes between them. As used herein, the timing distance between two objects may be calculated as the number of states of latency between the objects divided by the associated clock period. Thus, objects with larger timing distances may not need to be closely positioned next to one another whereas objects having a small timing distance (e.g., due to small number of states of latency or high clock speed) may need to be positioned closer to one another. As can be appreciated, the use of "small" and "larger" timing distance is relative and can depend on a number of factors including the level of abstraction (e.g., if abstraction is occurring at the chip level vs. the block level), the number of blocks on the chip, the number of cells and macros in a block, the number of ports, the overall number of objects on the chip, the physical size of the chip, etc. Regarding latency, if there are more states of latency between objects, then the connectivity weight is lower whereas objects have fewer states of latency therebetween will have a higher connectivity weight (if all other factors are equal). A single state of latency would be a scenario where one macro is directly connected to another macro or port through some or no combinational logic, but no register. This would be considered the strongest latency connection.

Two objects may be defined as having a low connectivity weight if they are determined to not be highly connected based on none of the above factors being true. Two objects may be defined as having a moderate connectivity weight if only one of the above factors is true. In some embodiments, objects that have a high connectivity weight may need to be physically positioned closer to one another than objects that have a low connectivity weight. In other words, if two objects have a high connectivity weight, it may be necessary from a floor planning view to have those objects close to one another to accommodate the: (1) multiple connections; (2) multiple states of latency; (3) small timing distance therebetween; and/or (4) shared common nodes.

Instead of simply looking at whether two or more factors are true to determine if objects have a high connectivity weight, the floor planning module 236 may alternatively or additionally be configured to calculate an actual value that represents the connectivity weight for objects. The calculated value may correspond to any value and can consider the factors described above in addition to other weighting factors. For instance, the number of connections between objects may be weighted more heavily in calculating the connectivity weight as compared to the timing distance. Thus, a larger multiplier may be used for number of connections as compared to the timing distance. Illustratively and without intending to limit the scope of the present disclosure, the connectivity weight may be calculated as values ranging from zero (e.g., not connected) to 100 (e.g., the highest possible connectivity between objects). Objects having a connectivity weight value that is larger than 70 may be considered to have a high connectivity weight whereas objects having a connectivity weight value that is less than 40 may be considered to have a low connectivity weight. Again, these calculations can be performed in any way and are for illustrative purposes only.

Based on the determined connectivity weights (or values) for the objects and individual pins thereof, object groupings (and connection groupings) may be determined by the floor planning module 236 (step 516). The grouping can be based on objects having connectivity weights within a common range (e.g., objects with high connectivity weights may be grouped together whereas objects with moderate or low connectivity weights may not be grouped together). Thus, the objects having the higher connectivity weights and need to be physically closer to one another may be presented in a common group (step 520). The presentation of object groupings or the connections for such object groupings may be provided with common highlighting, color, text size, font, brightness, etc. Alternatively or additionally, a box or series of lines can be drawn around the objects that have been grouped together to highlight the group. Such a modified presentation of the objects (e.g., common highlighting or drawing of group boxes 304) having a connectivity weight greater than a predetermined value or meeting two or more of the factors used to determine a connectivity weight enables the user to quickly understand that the objects belonging to the group are not as flexible in their placement or movement around the chip. Conversely, the user is able to identify those objects not belonging to a group having a high connectivity weight and understand that such objects are more flexible in the placement on the chip, thereby making such objects prime candidates for movement during design iterations.

Figure 6:
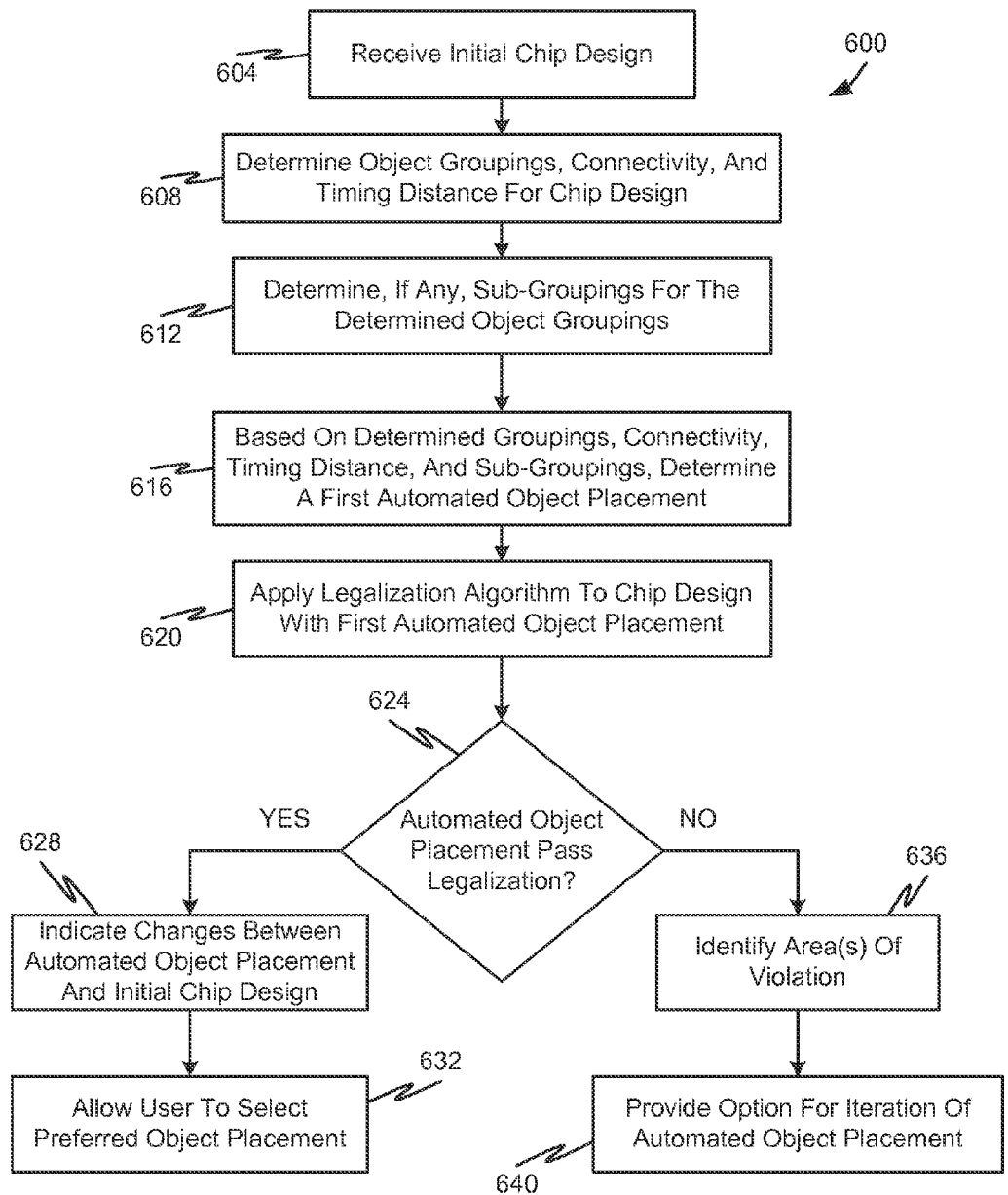
FIG. 6 is a flow diagram depicting a method of performing automated object placement for a chip design in accordance with embodiments of the present disclosure.

With reference now to FIG. 6, a process 600 of performing automated object placement for a chip design will be described in accordance with embodiments of the present disclosure. The process 600 of iterating a chip design is often performed partially or completely by a user of the floor planning tool 236; however, it should be appreciated that with the removal of combinational logic and the calculation of connectivity weights for objects in a chip layout, it may become possible to implement partial or complete automated design iterations, thereby minimizing the amount of time that a chip designer is required to iterate on the layout. The process 600 begins when an initial chip design is received at the floor planning module 236 (step 604). The floor planning module 236 then determines object groupings, connectivity weights, and timing distances for the objects in the chip design (e.g., with the combinational logic bypassed)(step 608). The floor planning module 236 may further determine if there are any sub-groupings for the determined object groupings (step 612). For instance, a group of objects consisting of only two object would not need sub-groups determined therefor whereas a group of objects consisting of more than 10 objects (e.g., a larger number of objects) may benefit from being sub-divided into sub-groups. The groups and sub-groups may be displayed sequentially or simultaneously. For instance, a group may be identified with a box 304 drawn around the objects belonging to the group whereas the sub-groups may be identified by common highlighting.

Based on the determined groupings, connectivity, timing distances, and sub-groupings, the floor planning module 236 may determine a first automated object placement (step 616). The first automated placement may attempt to move objects belonging to a group or sub-group physically closer to one another or by moving objects not belonging to a group around in an attempt to minimize the footprint of the objects, maximize the timing performance of the objects, or achieve some other design objective. The floor planning module 236 then applies a legalization algorithm to the chip design having the first automated object placement (step 620). The legalization algorithm may enforce certain design rules such as objects are not allowed to overlap one another, certain objects or pins must be positioned as certain locations (e.g., some modules or objects may need to be positioned at a perimeter of the chip to have access to an I/O pin of the chip, etc. The legalization algorithm may also account for timing requirements of the objects. For instance, the legalization algorithm may require that objects not be moved so as to violate timing requirements for a pair of objects or the legalization algorithm may require that certain connections must have a certain number of states of latency therebetween.

Based on the application of the legalization algorithm, the floor planning module 236 determines of the automated placement passes legalization (step 624). If this query is answered affirmatively, then the chip design may maintain its modification and the changes between the automated object placement and the initial chip design received in step 604 may be highlighted or otherwise indicated for the user (step 628). A fully-automated process may then completely effect the changes whereas a partially-automated process may allow the user to select a preferred object placement by accepting some or all of the automated object placement (step 632).

With reference back to step 624, if this query is answered negatively, then the area(s) of violation are identified (step 636) and presented to the user. The user may then be provided with an option for further iterations of the automated object placement (step 640). If the option is selected by the user, then the process 600 may return back to step 604 using either the initial chip design or the first automated object placement as the starting point and requiring that the previously-used object placement not be allowed in further iterations.

Figure 7:
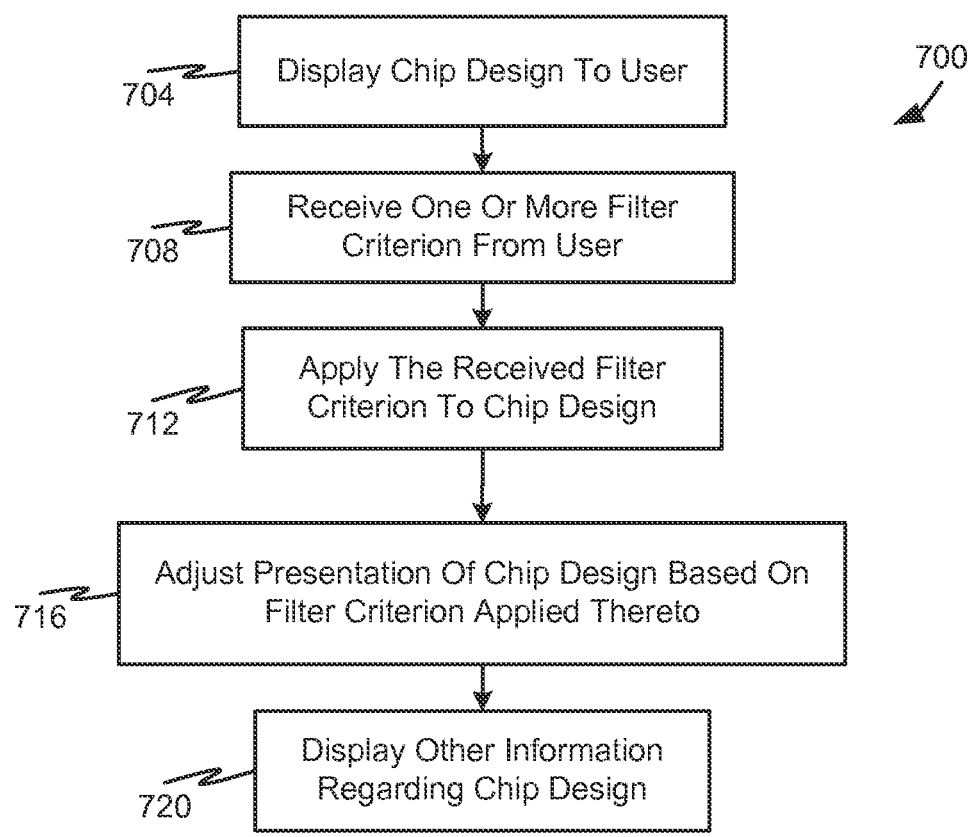
FIG. 7 is a flow diagram depicting a method of receiving filter criteria and adjusting a presentation of objects in a chip design in accordance with embodiments of the present disclosure.

With reference now to FIG. 7, a process 700 for receiving filter criteria and adjusting a presentation of objects in a chip design will be described in accordance with embodiments of the present disclosure. The process 700 begins when a chip design is displayed to a user (step 704). The displayed design may correspond to an initial chip design, an automated adjustment of a chip design, or some other design iteration of a chip design. The process 700 continues when the user provides one or more filter criterion to be applied to the chip design (step 708). The filter criterion may include filtering based on connectivity weights, timing distance, groups, sub-groups, object types, number of connections between pairs of objects, common nodes, extended timing paths, properties for objects, properties for connections, etc.

The received filter criterion is then applied to the chip design (step 712) and the presentation of the chip design is adjusted based on the filter criterion applied thereto (step 716). In addition to altering the presentation of the chip design, the filter module 252 may present additional informational elements 308, 312, 316 along with any of the objects or connections meeting (or failing to meet) the filter criterion received from the user (step 720). Presentation of objects or connections meeting (or failing to meet) the search criterion along with the additional informational elements can help the user identify potential candidates for object movement, potential areas of objects that must be moved together (e.g., as a group), potential areas of objects that cannot be moved, etc. All of this information helps aid the design iteration process.

Figure 8:
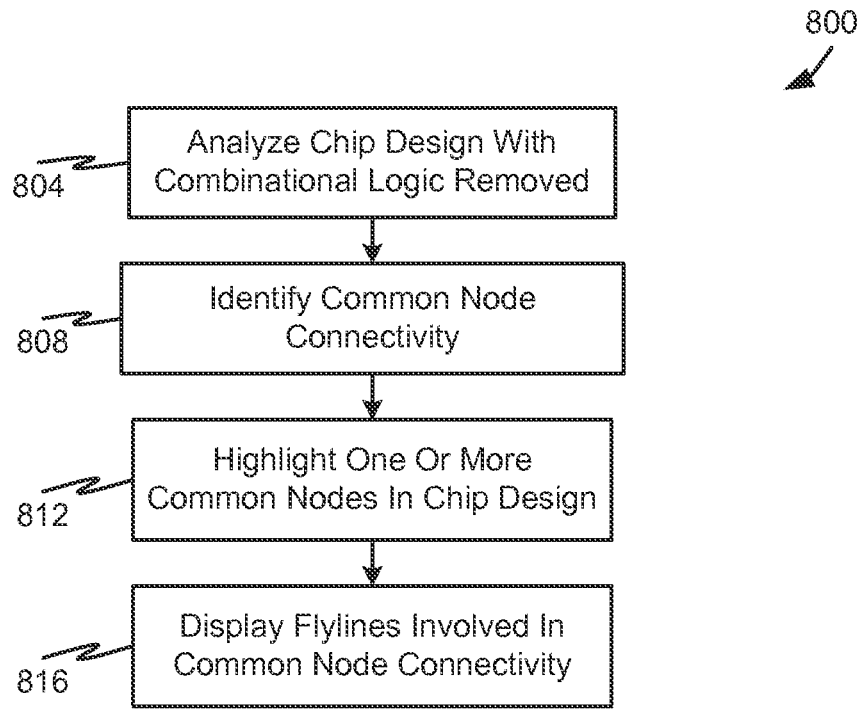
FIG. 8 is a flow diagram depicting a method of identifying and displaying common node connectivity in accordance with embodiments of the present disclosure.

With reference now to FIG. 8, a process 800 of identifying and displaying common node connectivity will be described in accordance with embodiments of the present disclosure. The process 800 begins by analyzing a chip design with the combinational logic bypassed or otherwise removed from the analysis (step 804). Analyzing the chip design without the combinational logic enables the floor planning module 236 to identify common node connectivity within the chip design (step 808). Common nodes may correspond to any synchronous cell (e.g., macro, register, pin, or port) that is simultaneously being driven by two or more objects or that is simultaneously driving two or more objects. It is often difficult to identify such objects when the combinational logic is present. However, with the combinational logic removed from the chip design, the floor planning module 236 is better able to identify the common nodes in the chip design.

The common nodes identified by the floor planning module 236 are then highlighted (step 812). In some embodiments, all of the common nodes identified in step 808 are highlighted in step 812. In some embodiments, one or less than all of the common nodes identified in step 808 are highlighted in step 812. The process 800 continues with the floor planning module 236 presenting a display of flylines (or similar connectors) that are involved in the common node connectivity (step 816). In some embodiments, this presentation step may include hiding or otherwise deemphasizing the presentation of connections/flylines that are not directly connected to a common node.

The identification and highlighting of connections involved in a common node connection is useful because common nodes often have more strict timing requirements associated therewith. As such, movement of common nodes often impact multiple portions of a chip design. This means that chip designers may be well-served to try and move objects that are not involved in a common node connection so as to avoid negatively impacting the timing of other portions of a chip design. Alternatively, it may be desirable to know where common nodes are located so that if it is necessary to move a common node, then it is easier to identify the other objects that may be impacted by such a move.

Figure 9:
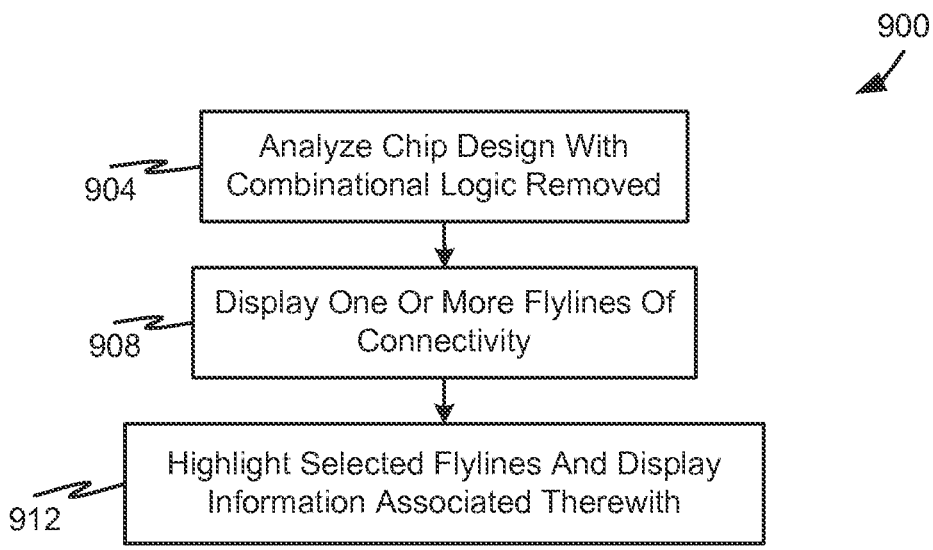
FIG. 9 is a flow diagram depicting a method of highlighting flylines and displaying information associated therewith for a chip design in accordance with embodiments of the present disclosure.

With reference now to FIG. 9, a process 900 for highlighting flylines and displaying information associated therewith for a chip design will be described in accordance with embodiments of the present disclosure. The process 900 begins with the floor planning module 236 analyzing the chip design with combinational logic bypassed or otherwise removed therefrom (step 904). It should be appreciated that the analysis may be performed on the chip design without the combinational logic bypasses, but such an analysis is more difficult and time-consuming.

Thereafter, the process 900 continues with the visualization module 248 displaying one or more flylines of connectivity (step 908). In other words, single flylines may be presented as a representation of one or more connections between objects. By presenting flylines as individual indicators of object-to-object connections, the presentation of the chip design is simplified.

A user may then be allowed to select a flyline or object of interest. In response to receiving such a selection (or a filter criterion), the floor planning module 236 may utilize the visualization module 248 to highlight the selected flyline(s) and display an informational element 308, 312, 316 that is associated therewith (step 912). This presentation may correspond to a highlighting of selected flylines, a highlighting of flylines meeting the search criterion, a deemphasized presentation of non-selected flylines, etc.

Figure 10:
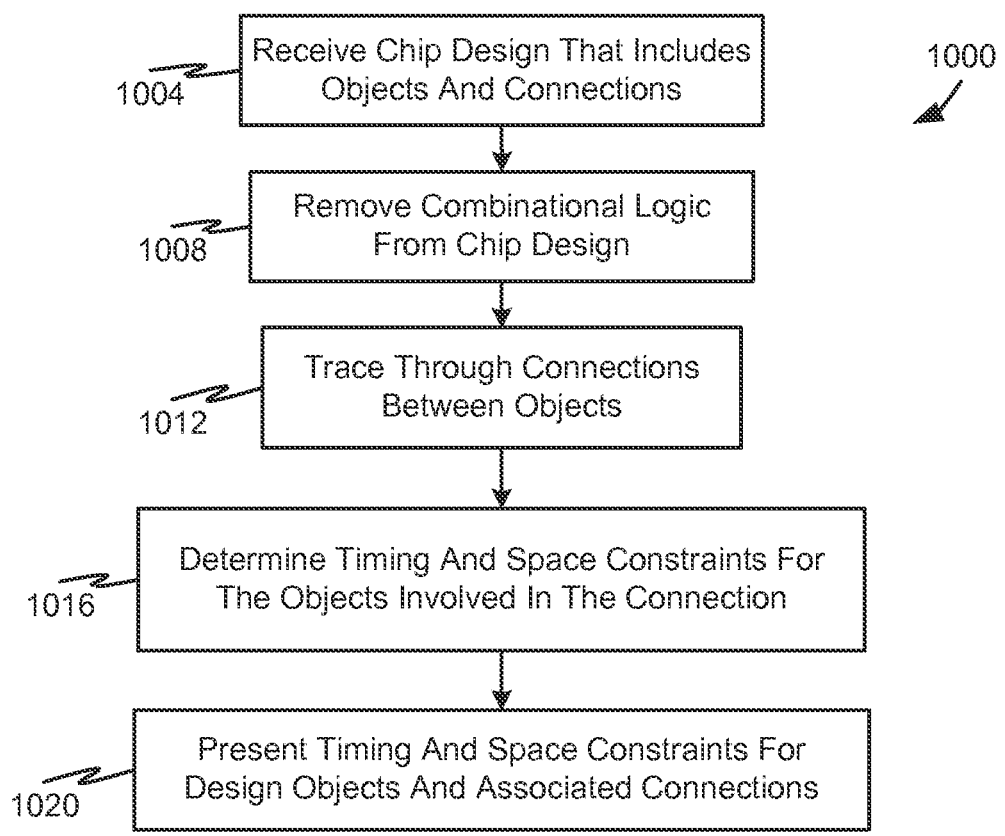
FIG. 10 is a flow diagram depicting a method of determining and presenting timing and space constraints for a chip design in accordance with embodiments of the present disclosure.

Referring now to FIG. 10, a process 1000 for determining and presenting timing and space constraints for a chip design will be described in accordance with embodiments of the present disclosure. The process 1000 begins with the floor planning module 236 receiving a chip design that includes objects, their placement on the physical layout of the chip, and the connections therebetween (step 1004). The floor planning module 236 then utilizes the timing analyzer 244 to remove the combinational logic from the chip design (e.g., to bypass the combinational logic)(step 1008). With the combinational logic bypassed, the floor planning module 236 traces through the connections between the objects (step 1012). As the floor planning module 236 traces through the connections in step 1012 (e.g., with the combinational logic removed therefrom), the floor planning module 236 determines timing and space constraints for the objects involved in each connection being analyzed (step 1016). This step is iteratively performed for each connection between synchronous cells. Once every connection between synchronous cells has been analyzed by the floor planning module 236, the process 1000 continues with the visualization module 248 presenting the timing and/or space constraints for the objects and the associated connections (step 1020). This information may be presented in a separate report or as an informational element 308, 312, 316 associated with a connection or object.

Figure 11:
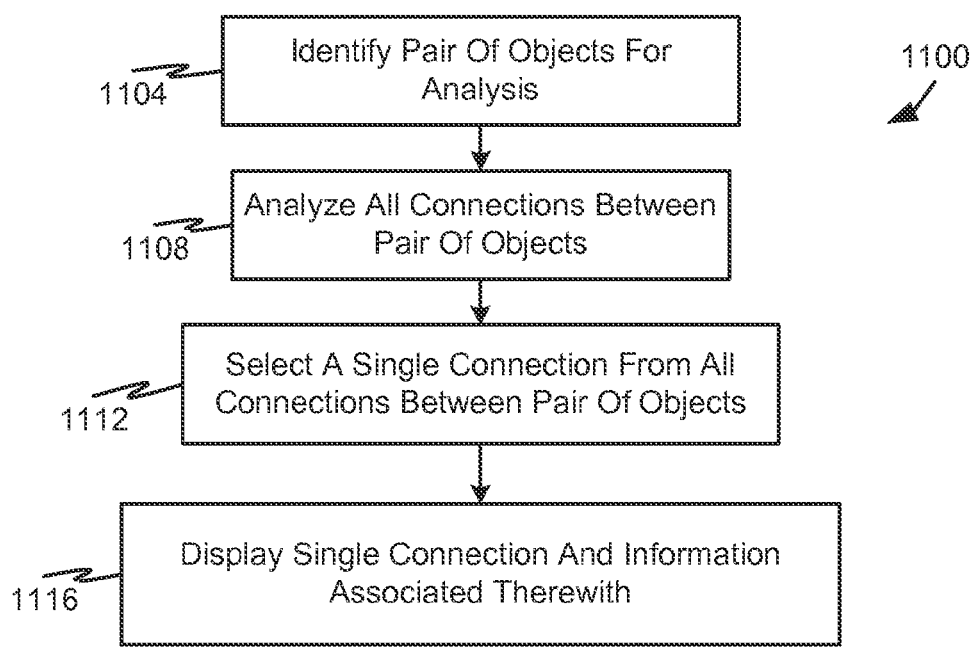
FIG. 11 is a flow diagram depicting a method of displaying object-to-object connection information in accordance with embodiments of the present disclosure.

With reference now to FIG. 11, a process 1100 for displaying object-to-object connection information will be described in accordance with embodiments of the present disclosure. It should be appreciated that in some embodiments, the connectivity extraction (see FIG. 5) can be performed first and once that process is completed, the presentation of the connectivity data in various ways can be augmented by the user (e.g., by defining presentation filter criteria, by interacting with the design, etc.). However, it may also be possible to perform the connectivity extraction interactively with the presentation and re-presentation of connectivity data.

The process 1100 begins with the floor planning module 236 identifying a pair of objects for analysis (step 1104). The pair of objects then have every connection therebetween analyzed for timing information, number of objects traversed, etc. (step 1108). Again, this may be performed during connectivity extraction or during run-time where the user is interacting and viewing different portions of the chip design. In some embodiments, the pair of objects may only have a single connection therebetween. In some embodiments, the pair of objects may have a plurality of connections therebetween (e.g., with different connections traversing different routes, going through different registers, traversing different combinational logic, etc.). If the pair of objects has a plurality of connections, then the process 1100 continues with the floor planning module 236 selecting a single connection from all of the connections as a representative connection for the pair of objects (step 1112). In some embodiments, the connection that is most constraining on the timing between the objects is selected in step 1112. In some embodiments, the connection that is physically the longest (or physically the shortest) is selected in step 1112. The selected connection is then displayed along with any information that is associated therewith (or that is associated with other connections between the pair of objects)(step 1116). The single connection may be displayed to the exclusion of other connections as a bold line or as a flyline between the pair of objects. The presentation of a single connection helps simplify the presentation of the overall chip design and allows the user to focus on the pair of objects and the critical connection data associated therewith instead of being distracted by multiple lines representing each connection between the pair of objects.

Specific details were given in the description to provide a thorough understanding of the embodiments. However, it will be understood by one of ordinary skill in the art that the embodiments may be practiced without these specific details. In other instances, well-known circuits, processes, algorithms, structures, and techniques may be shown without unnecessary detail in order to avoid obscuring the embodiments.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A method for presenting synchronous cell connectivity in a semiconductor chip design, the method comprising:
   receiving, at a microprocessor, a semiconductor chip design that comprises a plurality of objects therein, the objects including at least one of blocks, modules, macros, and cells;
   bypassing, with the microprocessor, combinational logic of the objects in the semiconductor chip design to obtain a representation of the semiconductor chip design that includes connectivity of synchronous cells and ports thereof; and
   providing, with the microprocessor, a presentation of the semiconductor chip design based on the representation of the semiconductor chip design with the bypassed combinational logic of the objects.

2. The method of claim 1, wherein registers, macros, and connections therebetween are included in the presentation of the semiconductor chip design and wherein the presentation of the semiconductor chip design excludes a presentation of the combinational logic.

3. The method of claim 1, further comprising:
   using the semiconductor chip design with the bypassed combinational logic to determine, with the microprocessor, connectivity weights for two or more objects of the semiconductor chip design, wherein connectivity weights are determined based on one or more of a number of connections between objects, a number of states of latency between objects, and timing distance between objects;
   using the semiconductor chip design with the bypassed combinational logic to determine, with the microprocessor, connectivity for pins of the two or more objects;
   based on the determined connectivity weights and connectivity for pins, determining, with the microprocessor, object groupings; and
   presenting, with the microprocessor, the object groupings with the presentation of the semiconductor chip design.

4. The method of claim 3, wherein each object grouping is colored differently in the presentation of the semiconductor chip design.

5. The method of claim 3, further comprising:
   using the object groupings to determine, with the microprocessor, a first automatic placement for the objects on the semiconductor chip design; and
   creating, with the microprocessor, an adjusted semiconductor chip design that includes objects placed according to the determined first automatic placement for the objects.

6. The method of claim 5, further comprising:
   running, with the microprocessor, a legalization algorithm on the semiconductor chip design to ensure that each object is not overlapping any other object and further ensure that no object is placed beyond a semiconductor chip boundary.

7. The method of claim 3, wherein timing distance is calculated by dividing a number of states of latency between a pair of objects by a clock period that occurs over the number of states of latency.

8. The method of claim 3, further comprising:
    determining, with the microprocessor, at least one sub-group within an object grouping; and
    displaying, with the microprocessor, objects belonging to the at least one sub-group differently from other objects belonging to the object grouping but not the at least one sub-group.

9. The method of claim 1, further comprising:
    receiving, at the microprocessor, a presentation filter criteria that includes at least one type of object to be included or excluded from the presentation of the semiconductor chip design; and
    applying the presentation filter criteria, with the microprocessor, so as to exclude or include objects in accordance with the presentation filter criteria.

10. The method of claim 1, further comprising:
    displaying, with the microprocessor one or more flylines that show at least one of node connectivity, common node connectivity, and extended timing path connectivity.

11. The method of claim 1, further comprising:
    based on the representation of the semiconductor chip design that includes connectivity of synchronous cells and ports thereof, identifying, with the microprocessor, one or more common nodes that correspond to synchronous cells that are either being simultaneously driven by two other nodes or simultaneously driving two different nodes; and
    highlighting, with the microprocessor, the one or more common nodes in the presentation of the semiconductor chip design.

12. The method of claim 1, further comprising:
    receiving, at the microprocessor, filter criteria for connectivity extraction; and
    performing connectivity extraction, with the microprocessor, on less than every connection of the semiconductor chip design based on the filter criteria received for the connectivity extraction.

13. The method of claim 1, wherein a cell represents a first-level abstraction of physical transistors and digital circuit components in the semiconductor chip, wherein a macro comprises one or multiple cells, wherein a module comprises one or multiple macros, and wherein a block comprises one or multiple modules.

14. A non-transitory computer-readable medium comprising processor-executable instructions that, when executed by a processor enable a presentation of synchronous cell connectivity in a semiconductor chip design, the instructions comprising:
    instructions configured to receive a semiconductor chip design that comprises a plurality of objects therein, the objects including at least one of blocks, modules, macros, and cells;
    instructions configured to bypass combinational logic of the objects in the semiconductor chip design to obtain a representation of the semiconductor chip design that includes connectivity of synchronous cells and ports thereof; and
    instructions configured to provide a presentation of the semiconductor chip design based on the representation of the semiconductor chip design with the bypassed combinational logic of the objects.

15. The computer-readable medium of claim 14, wherein registers, macros, and connections therebetween are included in the presentation of the semiconductor chip design and wherein the presentation of the semiconductor chip design excludes a presentation of the combinational logic.

16. The computer-readable medium of claim 14, further comprising:
    instructions configured to use the semiconductor chip design with the bypassed combination logic to determine object groupings, wherein each object assigned to an object grouping is assigned thereto based on one or more of a number of connections between other objects in the object grouping, a number of states of latency between other objects in the object grouping, and timing distance between other objects in the object grouping; and
    instructions configured to present the object groupings with the presentation of the semiconductor chip design.

17. The computer-readable medium of claim 15, wherein each object grouping is colored differently in the presentation of the semiconductor chip design.

18. The computer-readable medium of claim 15, further comprising:
    instructions configured to use at least one of the object groupings and sub-groups to determine a first automatic placement for the objects on the semiconductor chip design; and
    instructions configured to create an adjusted semiconductor chip design that includes objects placed according to the determined first automatic placement for the objects.

19. The computer-readable medium of claim 17, further comprising:
    instructions configured to run a legalization algorithm on the semiconductor chip design to ensure each object is not overlapping any other object and further ensure that no object is placed beyond a semiconductor chip boundary.

20. The computer-readable medium of claim 14, further comprising:
    instructions configured to receive a presentation filter criteria that includes at least one type of object to be included or excluded from the presentation of the semiconductor chip; and
    instructions configured to apply the presentation filter criteria so as to exclude or include objects in accordance with the presentation filter criteria.

21. The computer-readable medium of claim 14, further comprising:
    instructions configured to, based on the representation of the semiconductor chip design that includes connectivity of synchronous cells and ports thereof, identifying one or more common nodes that correspond to synchronous cells that are either being simultaneously driven by two other nodes or simultaneously driving two different nodes; and
    instructions configured to highlight the one or more common nodes in the presentation of the semiconductor chip design.

22. A system that enables presentation of synchronous cell connectivity in a semiconductor chip design, the system comprising:
    a microprocessor configured to execute computer-readable instructions; and
    computer memory having instructions stored thereon that enable the microprocessor to:
    receive a semiconductor chip design that comprises a plurality of objects therein, the objects including at least one of blocks, modules, macros, and cells;

bypass combinational logic of the objects in the semiconductor chip design to obtain a representation of the semiconductor chip design that includes connectivity of synchronous cells and ports thereof; and provide a presentation of the semiconductor chip design based on the representation of the semiconductor chip design with the bypassed combinational logic of the objects.

23. The system of claim 22, wherein registers, macros, and connections therebetween are included in the presentation of the semiconductor chip design and wherein the presentation of the semiconductor chip design excludes a presentation of the combinational logic.

* * * * *